United States Patent
Bank et al.

(10) Patent No.: US 9,535,667 B2
(45) Date of Patent: *Jan. 3, 2017

(54) CONTENT COLLAPSE OUTSIDE OF SELECTION

(75) Inventors: Christopher Bank, San Mateo, CA (US); Joaquin C. Blas, Jr., Pacifica, CA (US); John Skidgel, Berkeley, CA (US)

(73) Assignee: Adobe Systems Incorporated, San Jose, CA (US)

(*) Notice: Subject to any disclaimer, the term of this patent is extended or adjusted under 35 U.S.C. 154(b) by 2411 days.

This patent is subject to a terminal disclaimer.

(21) Appl. No.: 11/209,335

(22) Filed: Aug. 23, 2005

(65) Prior Publication Data
US 2014/0250422 A1 Sep. 4, 2014

(51) Int. Cl.
*G06F 9/44* (2006.01)
*G06F 17/00* (2006.01)

(52) U.S. Cl.
CPC ............... *G06F 8/34* (2013.01); *G06F 9/4443* (2013.01)

(58) Field of Classification Search
CPC .................................. G06F 8/34; G06F 9/4443
See application file for complete search history.

(56) References Cited

U.S. PATENT DOCUMENTS

| | | | |
|---|---|---|---|
| 5,185,698 A * | 2/1993 | Hesse et al. | 715/203 |
| 5,442,742 A * | 8/1995 | Greyson et al. | 715/210 |
| 6,105,036 A | 8/2000 | Henckel | |
| 6,151,426 A * | 11/2000 | Lee et al. | 382/319 |
| 6,851,105 B1 * | 2/2005 | Coad | G06F 8/20 717/106 |
| 6,931,625 B1 * | 8/2005 | Coad et al. | 717/109 |
| 2002/0010909 A1 * | 1/2002 | Charisius | G06F 8/20 717/106 |
| 2003/0131337 A1 | 7/2003 | Perumainar | |
| 2003/0145051 A1 * | 7/2003 | Bates et al. | 709/204 |
| 2003/0214538 A1 | 11/2003 | Farrington et al. | |
| 2003/0237046 A1 * | 12/2003 | Parker | G06F 17/24 715/234 |
| 2004/0064791 A1 * | 4/2004 | Hattori et al. | 715/517 |
| 2004/0075699 A1 * | 4/2004 | Franchi et al. | 345/860 |
| 2004/0085367 A1 | 5/2004 | Hagarty, Jr. | |
| 2005/0138540 A1 | 6/2005 | Baltus et al. | |
| 2006/0044597 A1 | 3/2006 | Dumitrescu et al. | |

OTHER PUBLICATIONS

Burkey and Sparkes, "Folding Editor—Comments Anyone?", Apr. 18, 1989, Usenet Post to group comp.sys.atari.st, Accessed via <http://groups.google.com>.*

Cross, J.H., II; Hendrix, T.D.; Barowski, L.A.; Mathias, K.S.; , "Scalable visualizations to support reverse engineering: a framework for evaluation," Reverse Engineering, 1998. Proceedings. Fifth Working Conference on , pp. 201-209, Oct. 12-14, 1998, doi: 10.1109/WCRE.1998.723190.*

(Continued)

*Primary Examiner* — James D Rutten
(74) *Attorney, Agent, or Firm* — Kilpatrick Townsend & Stockton LLP (57) ABSTRACT

A method, system, and computer program product for collapsing visual content on a screen including receiving input initiating a collapse function, and collapsing a section of visual content, the section of visual content outside of a selected portion of the visual content, the collapsing in response to said input.

20 Claims, 6 Drawing Sheets

(56) References Cited

OTHER PUBLICATIONS

Office Action of Apr. 29, 2009 in U.S. Appl. No. 11/210,250.
Office Action of Jul. 10, 2008 in U.S. Appl. No. 11/210,270.
Office Action of Jan. 7, 2009 in U.S. Appl. No. 11/210,270.
"Code Block Highlighter", IBM Technical Disclosure Bulletin, Issue 449. Sep. 16, 2001.
U.S. Appl. No. 11/210,250, filed Aug. 23, 2005.
Office Action dated Oct. 20, 2009 in related U.S. Appl. No. 11/210,250.
U.S. Appl. No. 11/210,270, filed Aug. 23, 2005.
Interview Summary dated Mar. 4, 2009 in related U.S. Appl. No. 11/210,270.
Examiner's Answer dated Nov. 25, 2009 in related U.S. Appl. No. 11/210,270.

* cited by examiner

CONTENT COLLAPSE OUTSIDE OF SELECTION

CROSS-REFERENCE TO RELATED APPLICATIONS

This application is related to U. S. patent application Ser. No. 11/201,250 filed Aug. 23, 2005, entitled AUTOMATIC CONTENT EXPANSION INDICATORS and to U. S. patent application Ser. No. 11/210,270, filed Aug. 23, 2005, entitled MESSAGE CUES WITHIN CONTENT COLLAPSE INDICATORS, the disclosures of which are hereby incorporated herein by reference.

TECHNICAL FIELD

This invention generally relates to collapsed/expanded content in rendered views, and specifically relates to collapsing non-selected code in Integrated Development Environments (IDEs).

BACKGROUND OF THE INVENTION

Integrated Development Environments (IDEs) are software tools that allow a developer (e.g., a web developer) to create web pages, websites, interactive applications, and the like for use by end users (e.g., visitors to websites). Various IDEs exist in the current marketplace, such as DREAMWEAVER™, available from MACROMEDIA INC. of San Francisco, Calif. and FRONTPAGE®, available from Microsoft Corporation. DREAMWEAVER™ is an IDE that allows web developers to design Hypertext Markup Language (HTML) web pages in both a code editor and a graphical-based design time environment. DREAMWEAVER™ also allows the developer to design in other languages, such as, for example, Extensible Markup Language (XML), Extensible HTML (XHTML), Active Server Page (ASP), COLDFUSION™ Markup Language (CFML™), and the like.

An IDE may allow a developer to create a document in an environment that includes both a text-based code view and a graphical-based design view. The code view renders the source code as text in a portion of the screen and allows the developer to see and manipulate the source code in the document file. For example, the developer may write and edit HTML or Cascading Style Sheets (CSS) code in the code view. The design view, on the other hand, is a What You See Is What You Get (WYSIWYG) view of the document that allows the user to visually manipulate the interpreted and graphically laid-out version of the document, such as, for example, by dragging, dropping, cutting, and pasting visual components. As the developer works, changes to the document are reflected in both the code view and the design view.

Further, an IDE may support a code collapse feature. Code collapse, or code folding, in this example, is the ability to visually replace portions of the text in a document with an image or button, in effect hiding it, so that it does not take up much screen space. Users typically employ such a feature to hide portions of the code that they are not interested in or to bring two or more portions of the code closer together so that scrolling is not necessary to view them at the same time.

Figure 1:
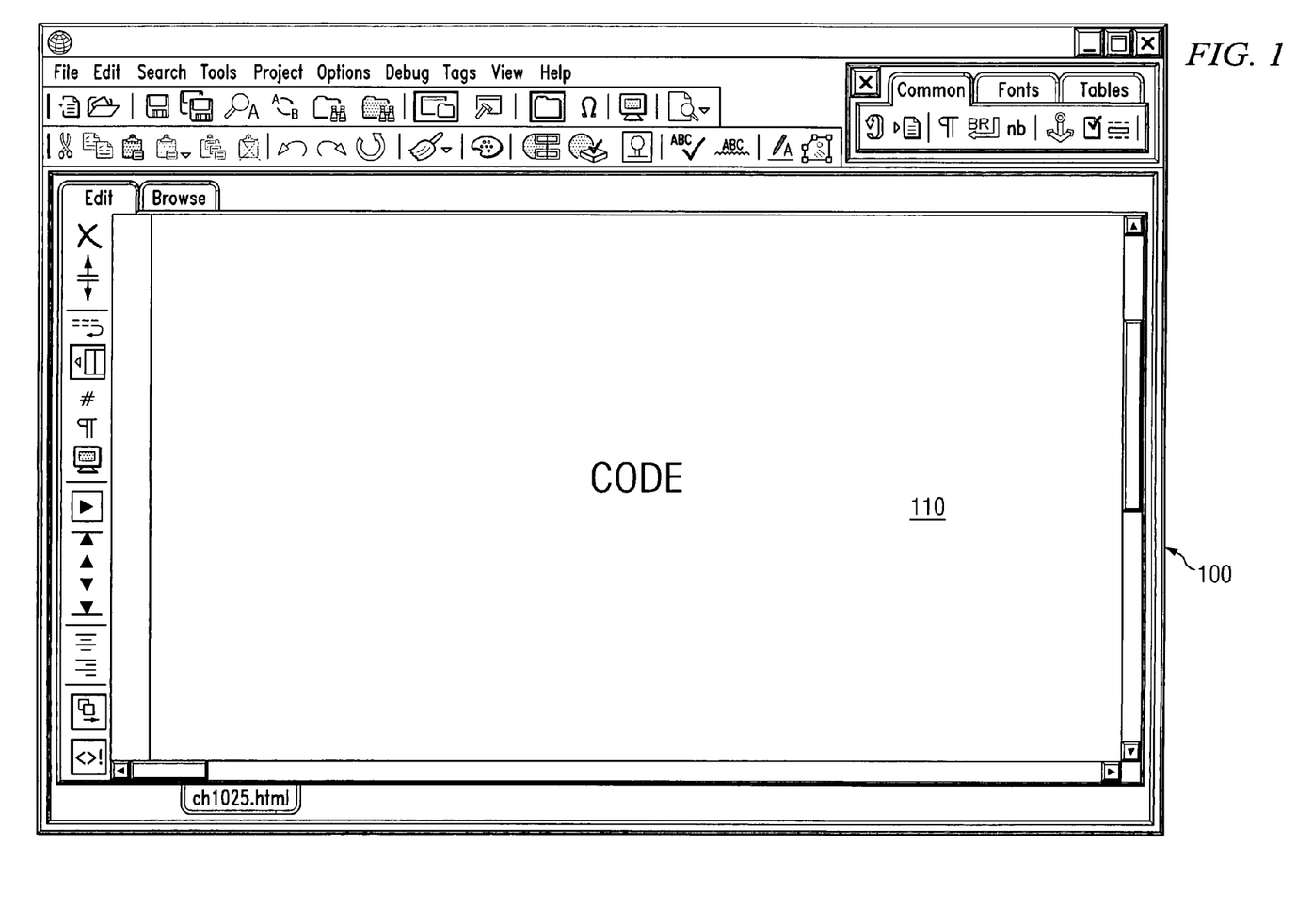
FIG. 1 is an illustration of an example screen from an IDE, including an example code view.
Figure 2:
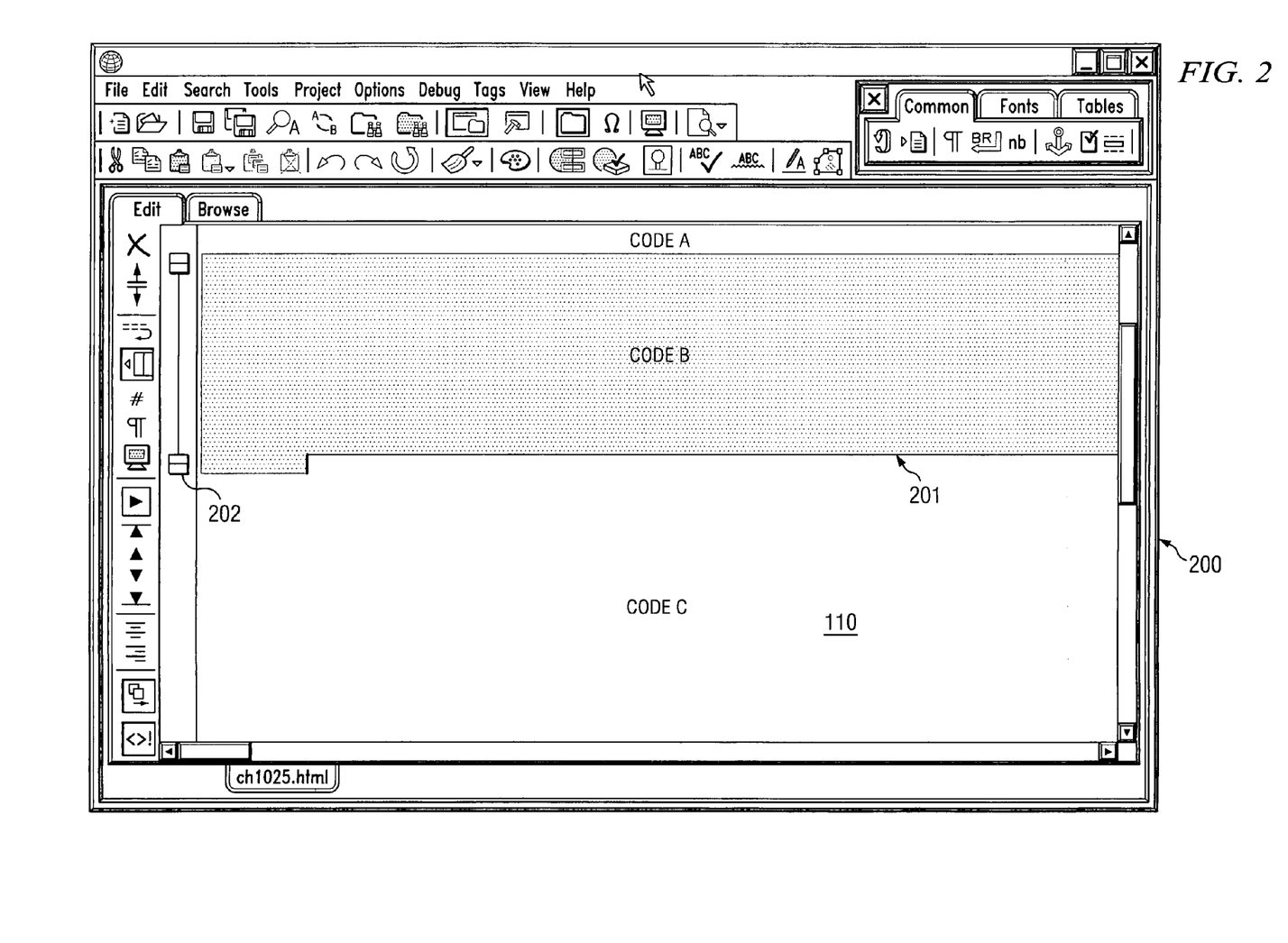
FIG. 2 is an illustration of an example screen from an IDE, including an example code view.
Figure 3:
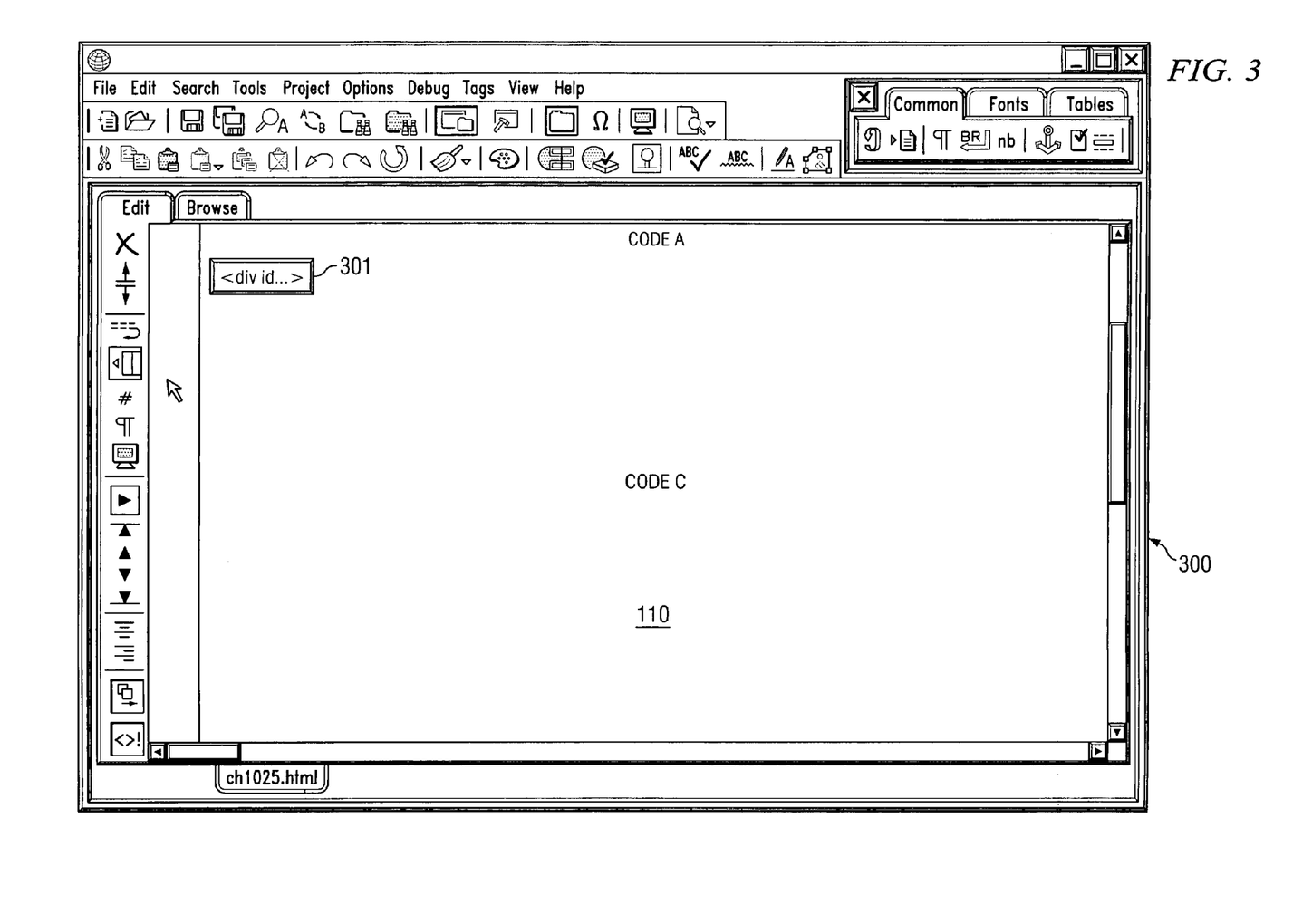
FIG. 3 is an illustration of an example screen from an IDE, including an example code view.

FIG. 1 is an illustration of example screen 100 from an IDE, including example code view 110. Code views, such as code view 110, are renderings of the source code as text for inspection, creation, and manipulation by the user. Example code view 110 is conceptual in that actual code is not shown thereon, but is understood to be represented by the word, "code." FIG. 2 is an illustration of example screen 200 from an IDE, including example code view 110. In screen 200, the user has selected code B 201. A user usually marks a region of source code (e.g., code 201) in code view 110 that he or she wants to collapse or hide. The marking may be performed by using a mouse or other pointing device to select code. The developer then indicates to the program that he or she desires to collapse selected code 201, for example, by clicking on widget 202 in the gutter area of code view 110. Internally, the program notates the region by dropping markers that capture the range that was selected—a marker at the beginning of the selection and a marker at the end of the selection. FIG. 3 is an illustration of example screen 300 from an IDE, including example code view 110. As shown in screen 300, when the IDE re-renders code view 110, it renders code collapse button 301 in the place of selected code 201.

When a developer is coding, his or her attention is usually focused on the selected portions of the code, rather than on other portions. Therefore, collapsing code often requires that the developer switch focus from an area of interest to one or more other areas for selecting and collapsing. The developer then returns to the area of interest to resume coding. Such actions may be inefficient, since they cause a developer to have to switch between areas of interest. Further, a developer may desire to collapse a section of code above and a section of code below a particular area of interest and may have to select and collapse each area separately. Therefore, to focus on a particular area of interest, the developer performs two collapsing functions while making sure that no part of the code of interest is accidentally selected and collapsed.

BRIEF SUMMARY OF THE INVENTION

The present invention, in at least one embodiment, is directed to a system, method, and computer program that provide a user with the ability to collapse code outside of a selection. In other words, the user may collapse code other than that selected. For example, a user working with an IDE program selects a portion of code in the code view that lies beneath a first portion and above a second portion. The user then provides input to the computer (e.g., through use of a mouse or other pointing device or a keyboard) that instructs the computer to collapse the first and second portions. The program then collapses the first and second portions so that only the selection remains rendered in the code view.

In another embodiment, the program searches for an enclosing tag that includes the selected portion of code. When the user instructs that non-selected portions be collapsed, the program collapses the code outside of the enclosing tag. An advantage of some embodiments is that the user may collapse code that he or she is not interested in without having to change a selection during the collapsing function, thereby providing a more efficient and pleasing user experience.

Further, it should also be noted that various embodiments of the invention are not limited to collapsing and expanding code in IDEs. Various embodiments may be applied to text editors, word processors, and the like, to collapse displayed text content. Still further, programs that collapse other content (e.g., visual elements) may benefit from one or more features described herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 4:
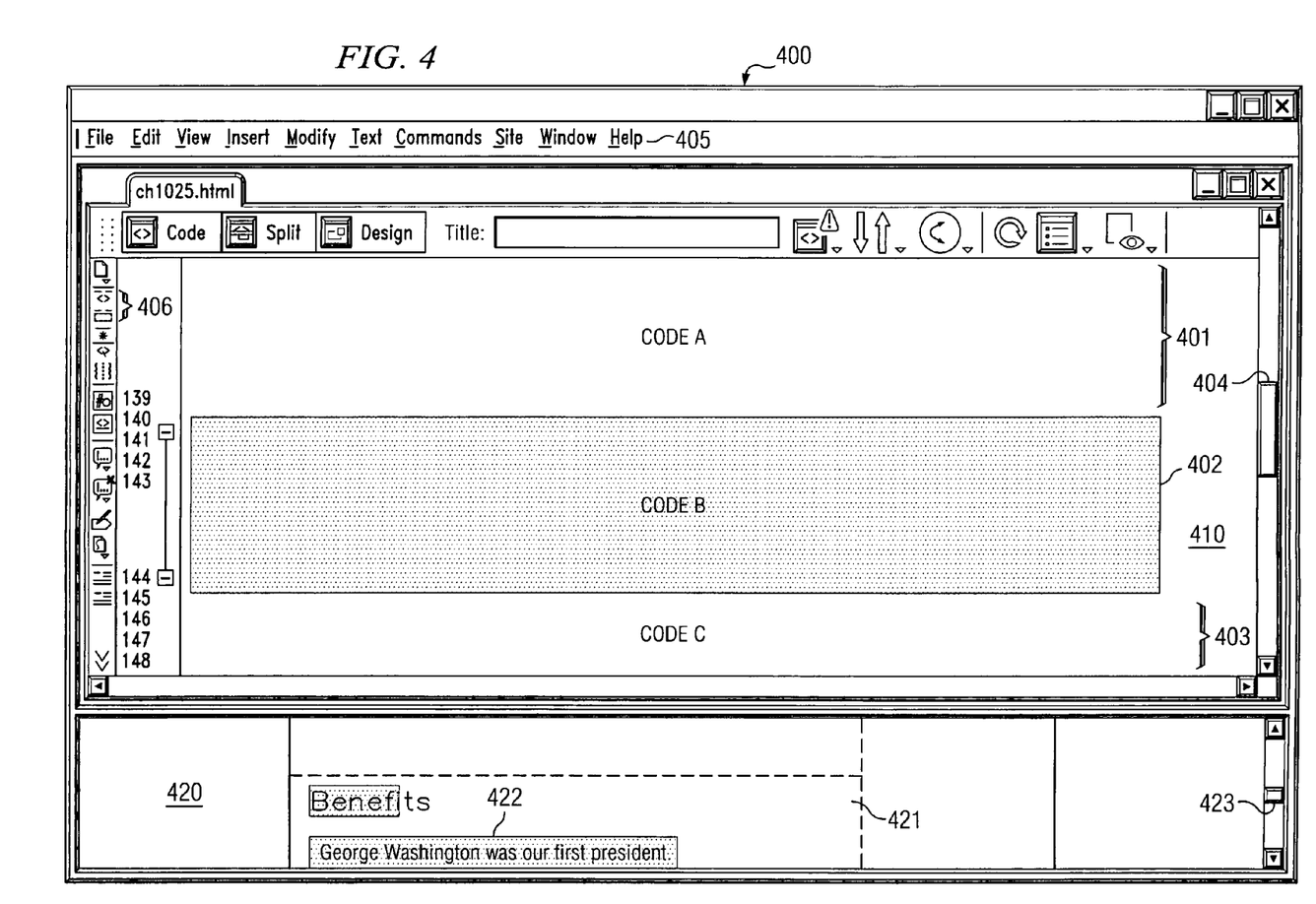
FIG. 4 illustrates an example screen, including a code view and a design view, adapted according to one embodiment of the invention.

FIG. 4 illustrates example screen 400, including code view 410 and design view 420, adapted according to one embodiment of the invention. Screen 400 is a document window that may be presented by DREAMWEAVER™ or other IDE program during document development. Code view 410 is a view of the source code of a document rendered on the screen as text. Code view 410 includes source code 401, source code 402, and source code 403, all replaced with "code." It should be understood that the word, "code," indicates conceptually that source code should be rendered as text in that area of screen 400. Source code 401 and 403 are both non-selected portions of source code, while code 402 is currently selected by the user, as evidenced by the background highlighting and negative rendering of code 402. Highlighting and negative rendering are two of the many possible indicators that a portion of source code has been selected. It should be noted that code view 410 shows only a portion of the source code at a time, and the user may employ scroll 404 to see other portions of the source code.

Design view 420 is a WYSIWYG view of the document, or, more accurately, an approximation of the document as it would look rendered by one of a variety of web browsers. Design view 420 shows only a portion of the rendered document, and the user may use scroll 423 to view other portions. Currently visible in design view 420 is a portion of visual component 421, showing that portion 422 is currently selected by the user and currently cut off at the bottom of design view 420. Portion 422 corresponds to source code 402, above. In other words, source code 402 describes selected portion 422, such that when source code 402 is laid out visually, the result is portion 422.

In this example, when selecting a portion of code, a developer may either interact with the code view, for example, by selecting portion 402 with a computer pointing device, or may interact with the design view, for example, by selecting portion 422 inside visual component 421 also with a computer pointing device. However, either method of user input operates to select a particular portion of source code. Other methods of user input exist, such as a keystroke-based method, and all are within the scope of various embodiments. As explained above, the program sets markers at the beginning and end point of the portion.

In order to collapse code 401 and 403, the developer may click on one of COLLAPSE SELECTION/COLLAPSE FULL TAG buttons 406 while holding down the ALT, OPTION, or other modifier key on a keyboard. Other methods exist for the developer to provide input initiating such a collapse. For example, a command in menu 405 may provide the functionality; also, the program may provide for the developer to right click on source code 402, thereby causing a context menu (not shown) to appear with such a command. The invention is not limited by method of user input, as long as the program allows the user to collapse code outside of what is currently selected.

Figure 5:
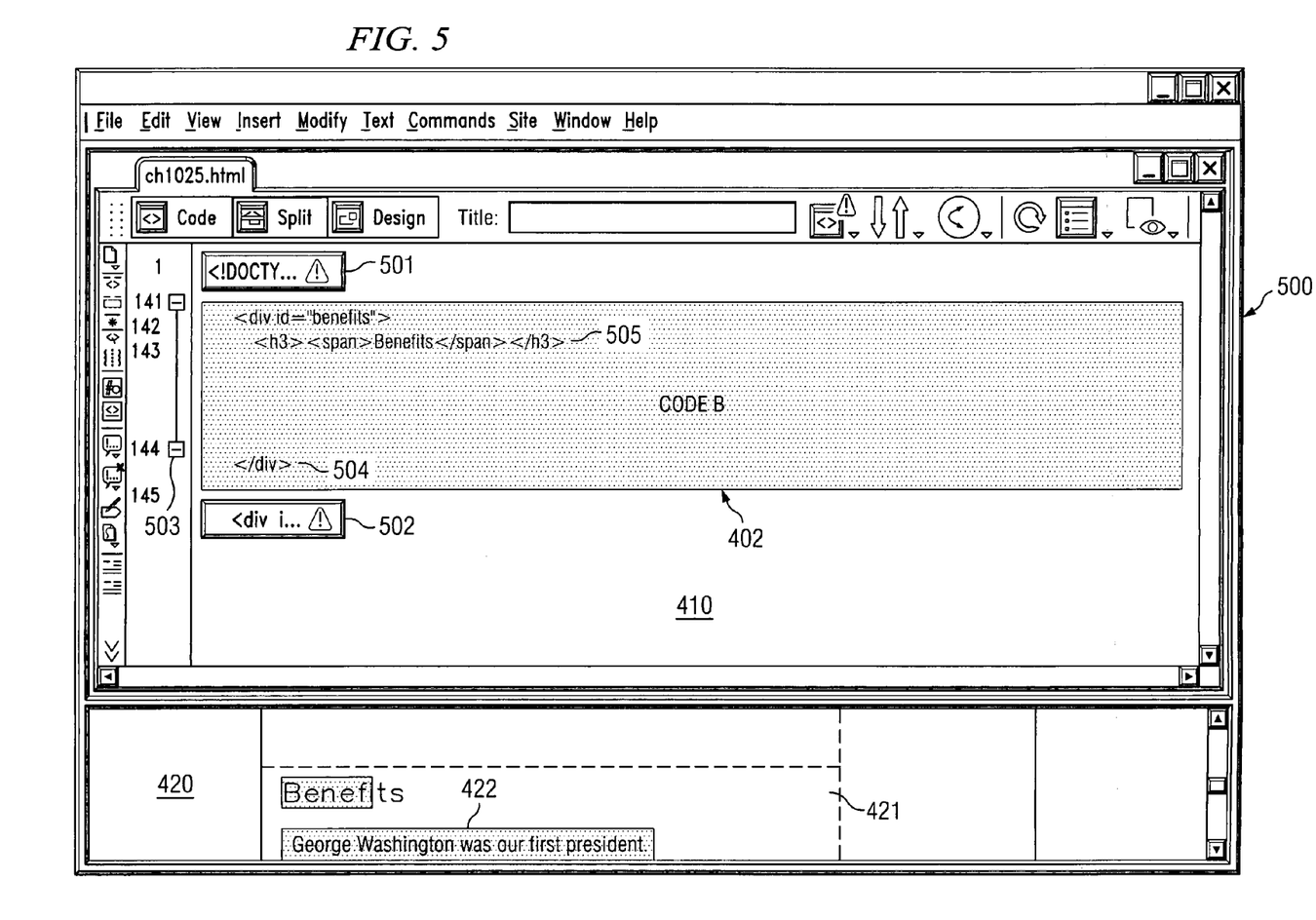
FIG. 5 illustrates an example screen, including a code view and a design view, adapted according to one embodiment of the invention.

FIG. 5 illustrates example screen 500, including code view 410 and design view 420, adapted according to one embodiment of the invention. In FIG. 5, the developer has collapsed code 401 and 403. Button 501 is now rendered in place of code 401 in code view 410. Further, button 502 is now rendered in place of code 403 in code view 410. While buttons are used in this example to replace collapsed code, the invention is not limited thereto. Other collapse indicators, such as icons, may also be used.

In this example, design view 420 with visual component 421 and selected portion 422 are unchanged, as code collapse affects code view 410 only. Further, collapsing outside of a selection, as illustrated by FIGS. 4 and 5, and collapsing a selection are not mutually exclusive, as shown by widget 503 that provides the developer with an option to collapse code 402 by clicking on the "minus" sign.

One advantage of the embodiment illustrated in FIGS. 4 and 5 is that the user is able to collapse two sections of code with one step, rather than with two steps. Further, code 402 may remain selected throughout the process, which is helpful to the user, since code 402 is of interest. Accordingly, the user does not have to change his attention from areas of interest when collapsing sections of code that are not of interest.

The example above illustrates collapsing outside of the beginning and end points that identify specifically-selected portions of code. More functionality may be added to the invention. For example, the invention may include collapsing outside of an enclosing tag, when the enclosing tag includes the selected portion. For instance, if in the previous example, the beginning point at the selection was at "<h3>" tag 505, and the ending point was at "</div>" tag 504 (thereby selecting the portion lines 142 to 144), the program would compare the beginning and ending points to the tags in the code to determine which tag is an enclosing tag. In this example, the lowest-level tag that fully encloses the selected portion is "<div>" tag 504. Therefore, the program would determine that <div> tag is the enclosing tag. When the user initiates the collapsing function, the program collapses the code that is outside of <div>tag 504, rather than simply collapsing lines 0-141 and 145 to end. Accordingly, such an example would achieve the same result as in FIG. 5.

Figure 6:
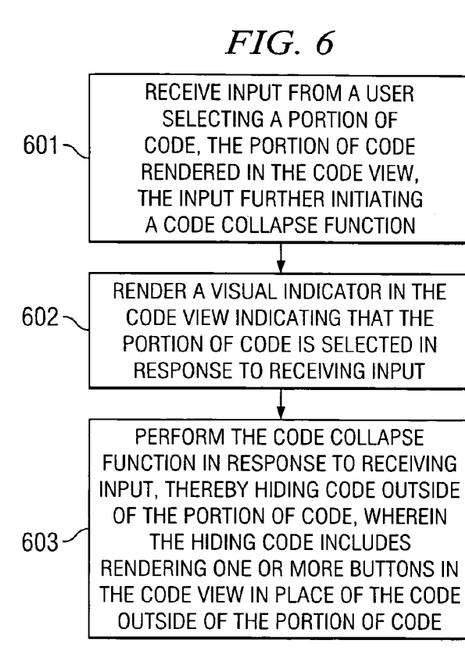
FIG. 6 is an illustration of an exemplary method, which may be performed by a computer system executing IDE software, the IDE providing a code view and a design view, the method adapted according to one embodiment of the invention.

FIG. 6 is an illustration of exemplary method 600, which may be performed by a computer system executing IDE software, the IDE providing a code view and a design view, the method adapted according to one embodiment of the invention. In step 601, the IDE receives input from a user selecting a portion of code, the portion of code rendered in the code view, the input further initiating a code collapse function. The user input that selects the portion can be, for example, signals generated from a mouse or other pointing device as the user selects the portion in the code view or selects a portion of a visual component in the design view corresponding to the code. When the IDE selects the portion based on user input in the design view, the IDE has intelligence built in that compares the visual component selection to find the corresponding section of source code and renders the selection of the source code in the code view.

The user input that initiates the collapse function may be, as described above, clicking on a button on the screen while pressing a modifier key or selecting a command from a menu. Additionally, the user input that selects the portion and the user input that initiates the collapse function may or may not be the same user input, and, in fact, the input that initiates the collapse function may be received after step 602 (described below) is performed. It should be noted that various embodiments are not limited to a particular method of receiving user input.

In step 602, the IDE renders a visual indicator in the code view indicating that the portion of code is selected in response to receiving input. The visual indicator may be, for example, background highlighting of the selected portion in the code view. The visual indicator may also be, for example, negative rendering in addition to highlighting. Any kind of visual indicator that informs the user that a particular portion is selected is within the scope of various embodiments. Further, as in FIGS. 4 and 5, the design view may also include visual indicators that inform the user that a portion of a visual component is selected and/or corresponds to a selected portion of source code.

In step 603, the IDE performs the collapse function in response to receiving input, thereby hiding code outside of the portion of code. In this example, the hiding of the code includes rendering one or more buttons in the code view in place of the code outside of the portion of code. In other words, the code collapse function collapses code other than the selected code. Other ways to hide code include using objects other than buttons in the code view, such as icons or the like. UI objects, including buttons, in the code view may provide a way for the user to expand the collapsed code. For instance, in this example, the user might click on a button or icon in order to expand the hidden code.

Figure 7:
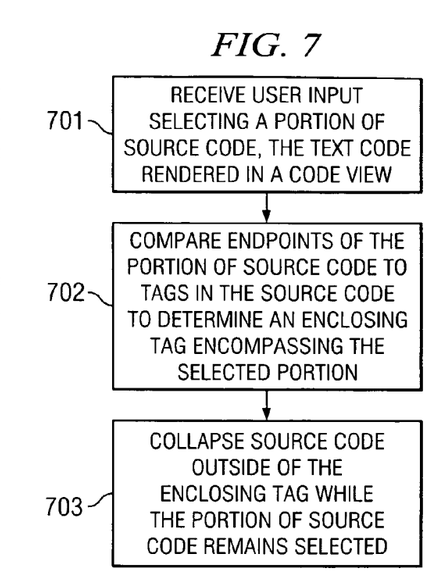
FIG. 7 is an illustration of an exemplary method, which may be performed by a computer system executing IDE software, the IDE providing a code view and a design view, the method adapted according to one embodiment of the invention.

FIG. 7 is an illustration of exemplary method 700, which may be performed by a computer system executing IDE software, the IDE providing a code view and a design view, the method adapted according to one embodiment of the invention. In step 701, the IDE receives user input selecting a portion of source code, the source code rendered in a code view. As described above, the source code may be selected through the design view or the code view by a variety of user inputs.

In step 702, the IDE compares endpoints of the portion of source code to tags in the source code to determine an enclosing tag encompassing the selected portion. In this step, the IDE "looks" at the source code to find an enclosing tag. A proper enclosing tag, may be, for example, the lowest-level tag that fully encompasses the selection, as described above with regard to FIG. 5.

In step 703, the IDE collapses source code outside of the enclosing tag while the portion of source code remains selected. In other words, the program collapses code other than that contained in the enclosing tag. For instance, if the code view shows source code above and below the enclosing tag before collapse, the collapsed view renders the code in the enclosing tag while collapsing the code above and below the tag. Further, the selected portion stays selected during the collapsing.

An advantage of such an embodiment is that it allows a developer to see other unselected portions of the code in the tag after the collapsing has been performed. Thus, if the developer realizes shortly after collapsing that he or she desires to see or edit other code in the tag, expanding and recollapsing code may not be required. Such a feature reflects an understanding that code of interest may include more than merely code selected at any given time, and that other code in an enclosing tag is often relevant to the developer's task whether or not the developer recognizes it at the time of selecting.

While the example described with regard to FIG. 7 to collapse outside of an enclosing tag, other embodiments may collapse outside of other enclosing contexts. Arbitrary enclosing characters or strings, such as open and closed curly braces, often used in programming languages, or delimiter strings like "—BEGIN COMMENT—" and "—END COMMENT—" are examples of possible enclosing contexts. Thus, while an IDE may use logic to determine an enclosing tag, similar logic may be used to determine other enclosing contexts in various embodiments.

The embodiment described above with regard to FIG. 7 that collapses code outside of an enclosing tag is not mutually exclusive with an embodiment that collapses code at the boundaries of a selection. For instance, a menu or context menu may provide both as commands, thereby allowing a user to choose a desired type of collapsing. Furthermore, the methods described with regard to FIGS. 6 and 7 may be modified in some embodiments, such that steps may be performed out of order, while other steps may be combined, added, or deleted.

The embodiments herein are described in the context of IDEs that include both a code view and a design view. However, the invention is not limited thereto. For instance, an IDE that provides a code view without a corresponding design view may benefit from one or more embodiments of the invention. Also, any kind of workspace environment that includes text that may be written and/or edited may benefit from the invention. In fact, source code is only one type of text, and various embodiments may be applied to code, rendered portions of text content, raw text, and the like. For example, a text file editor or even a word processor may benefit from collapsible text outside of a selection. Thus, a program that loads the contents of a document file, interprets the contents, and renders a representation of it to a user may benefit from the invention. In fact, various embodiments apply to IDEs and other tools that create documents in general, as well as tools that create interactive applications.

Other types of content may be collapsed and/or expanded, and, therefore, may find application in some embodiments. For instance, the collapse feature can be extended to operate on visual elements in a design view, for example, by hiding the contents of a table or paragraph. Accordingly, in one example embodiment in a design view, a user selects a visual element (e.g., a paragraph) and initiates a collapse function that collapses the non-selected elements. Similarly, a feature that collapses outside of an enclosing context may be adapted to operate within a program that collapses visual elements. For example, when a visual element is selected, the program may search the code defining the element for an enclosing tag and collapse elements lying outside of that enclosing tag.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, catridge media, flash memory, ROM, memory stick, and/or the like). In fact, readable media can include any medium that can store information.

Figure 8:
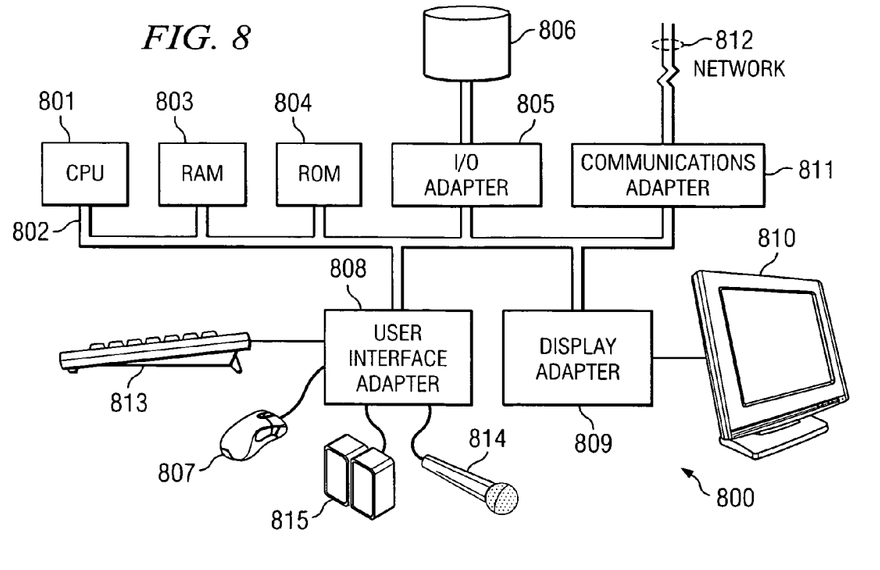
FIG. 8 illustrates an example computer system adapted according to embodiments of the present invention.

FIG. 8 illustrates example computer system 800 adapted according to embodiments of the present invention. That is, computer system 800 comprises an example system on which embodiments of the present invention may be implemented. Central processing unit (CPU) 801 is coupled to system bus 802. CPU 801 may be any general purpose CPU. However, the present invention is not restricted by the architecture of CPU 801 as long as CPU 801 supports the inventive operations as described herein. CPU 801 may execute the various logical instructions according to embodiments of the present invention. For example, CPU 801 may execute machine-level instructions according to the exemplary operational flows described above in conjunction with FIGS. 6 and 7.

Computer system 800 also preferably includes random access memory (RAM) 803, which may be SRAM, DRAM, SDRAM, or the like. Computer system 800 preferably includes read-only memory (ROM) 804 which may be PROM, EPROM, EEPROM, or the like. RAM 803 and ROM 804 hold user and system data and programs, as is well known in the art.

Computer system 800 also preferably includes input/output (I/O) adapter 805, communications adapter 811, user interface adapter 808, and display adapter 809. I/O adapter 805, user interface adapter 808, and/or communications adapter 811 may, in certain embodiments, enable a user to interact with computer system 800 in order to input information, such as, for example, instructing that code be collapsed.

I/O adapter 805 preferably connects to storage device(s) 806, such as one or more of hard drive, compact disc (CD) drive, floppy disk drive, tape drive, etc. to computer system 800. The storage devices may be utilized when RAM 803 is insufficient for the memory requirements associated with storing data for program 803. Communications adapter 811 is preferably adapted to couple computer system 800 to network 812 (e.g., the Internet). User interface adapter 808 couples user input devices, such as keyboard 813, pointing device 807, and microphone 814 and/or output devices, such as speaker(s) 815 to computer system 800. Display adapter 809 is driven by CPU 801 to control the display on display device 810 to, for example, display a code view to a user.

It shall be appreciated that the present invention is not limited to the architecture of system 800. For example, any suitable processor-based device may be utilized, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for collapsing source code, the method comprising:
    accessing a source code for edit in an Integrated Development Environment (IDE), wherein the source code defines an electronic document;
    providing a user interface of the IDE, wherein the user interface comprises a code view that displays the source code and a design view that displays visual content, wherein the visual content comprises a what you see is what you get (WYSIWYG) rendering of the electronic document based on the source code;
    receiving, in the design view of the user interface, input selecting a portion of the visual content, wherein the portion of the visual content corresponds to a portion of the source code and comprises a WYSIWYG rendering of a portion of the electronic document based on the portion of the source code;
    indicating, in the design view, that the portion of the visual content is selected;
    receiving, in the user interface, input initiating a collapse function to collapse an unselected portion of the source code that corresponds to an unselected portion of the visual content, wherein the unselected portion of the visual content comprises a WYSIWYG rendering of an unselected portion of the electronic document based on the unselected portion of the source code; and
    collapsing, in the code view, the unselected portion of the source code based on the selecting of the portion of the visual content and the input initiating the collapse function, wherein the unselected portion of the visual content is not collapsed in the design view based on the collapsing of the unselected portion of the source code.

2. The method of claim 1 further comprising:
comparing endpoints of said selected portion of visual content to one or more tags in said source code; and
in response to said comparing, defining a block of source code as source code within an enclosing context encompassing said selected portion, wherein said collapsing content comprises collapsing source code above and below the enclosing context so that only the source code within the enclosing context is not collapsed.

3. The method of claim 2 wherein said enclosing context is an enclosing tag.

4. The method of claim 1 wherein collapsing the unselected portion of the source code comprises rendering one or more buttons in the code view in place of the unselected portion of the source code.

5. The method of claim 1 wherein said selected portion of visual content is one or more of:
text rendered in a word processing window;
raw text; or
a visual element rendered in the design view.

6. The method of claim 1 wherein collapsing the second portion of the source code comprises collapsing portions above and below the first portion of the source code so that only the first portion of the source code is not collapsed in the code view.

7. The method of claim 1 wherein the design view comprises a WYSIWYG view that allows manipulation of the visual content.

8. The method of claim 1, wherein the code view displays an icon representing the collapse function, and wherein the input initiating the collapse function comprises a selection of the icon.

9. The method of claim 1, wherein the input initiating the collapse function comprises an interaction with the portion of the source code in the code view.

10. The method of claim 1, further comprising:
automatically selecting the portion of the source code based on the portion of the visual content being selected; and
indicating, in the code view, that the portion of the source code is selected.

11. A method for collapsing source code, the method comprising:
accessing a source code for edit in an Integrated Development Environment (IDE), wherein the source code defines an electronic document;
providing a user interface of the IDE, wherein the user interface comprises a code view that displays the source code and a design view that displays visual content, wherein the visual content comprises a what you see is what you get (WYSIWYG) rendering of the electronic document based on the source code;
receiving, in the design view, input selecting a first portion of the visual content, wherein the first portion corresponds to a first portion of the source code and is displayed based on a WYSIWYG rendering in the design view, wherein a visual indicator is displayed indicating that the first portion of the source code is selected;
receiving further input initiating a collapse function; and
performing the collapse function in response to the input initiating the collapse function by collapsing, in the code view, a second portion of the source code that corresponds to a second portion of the visual content, and wherein the second portion of the visual content is not collapsed in the design view based on the collapsing of the second portion of the source code.

12. The method of claim 11 wherein the source code comprises code from one or more of:
HTML;
ASP;
CSS; and
C#.

13. The method of claim 11, wherein the source code is text, the method further comprising:
comparing endpoints of the first portion to one or more enclosing contexts in the text; and
in response to the comparing, defining a block of text as text within and including an enclosing context encompassing the first portion, wherein collapsing the second portion comprises collapsing text above and below the enclosing context so that only the block of text within the enclosing context is not collapsed.

14. The method of claim 11 wherein performing the collapse function comprises hiding source code above and below the first portion of the source code so that only the first portion of the source code is not hidden in the code view.

15. A method for collapsing source code, the method comprising:
providing a user interface of an Integrated Development Environment (IDE), wherein the user interface comprises a code view of an electronic document that displays source code and a design view that displays visual content, wherein the visual content comprises a what you see is what you get (WYSIWYG) rendering of the electronic document based on the source code;
receiving input selecting a first portion of the visual content in the design view, wherein the first portion of the visual content corresponds to a first portion of the source code in the code view, wherein a visual indicator is displayed indicating that the first portion of the source code is selected;
receiving further input instructing a code collapse function; and
collapsing, in the code view and based on the input instructing the code collapse function and the first portion of the visual content being selected, a second portion of the source code that corresponds to a second portion of the visual content, and wherein the second portion of the visual content is not collapsed in the design view based on the collapsing of the second portion of the source code.

16. The method of claim 15 wherein collapsing the second portion of the source code comprises defining an enclosing context that encompasses the first portion of the source code, and wherein defining the enclosing context comprises comparing endpoints of the first portion of the source code to the enclosing context to ascertain that the enclosing context encompasses the first portion of the source code.

17. The method of claim 15 wherein said enclosing context is an enclosing tag.

18. A non-transitory computer readable medium having computer program logic recorded thereon for creating an electronic document, wherein the computer program logic when executed on a computing system configure the computer system to perform operations comprising:
providing a user interface of an Integrated Development Environment (IDE), wherein the user interface comprises a code view of the electronic document that displays source code and a design view that displays visual content, wherein the visual content comprises a what you see is what you get (WYSIWYG) rendering of the electronic document based on the source code;

receiving input selecting a first portion of the visual content in the design view, wherein the first portion of the visual content corresponds to a first portion of the source code, wherein a visual indicator is displayed in the code view indicating that the first portion of the source code is selected;

comparing endpoints of the first portion of the source code to tags in the source code to determine an enclosing tag encompassing the first portion of the source code;

receiving input initiating a collapse function to unselected source code;

collapsing, in the code view and based on the collapse function and the first portion of the visual content being selected, a second portion of the source code that corresponds to a second portion of the visual content, and wherein the second portion of the visual content is not collapsed in the design view based on the collapsing of the second portion of the source code.

19. The computer program product of claim 18 wherein the input initiating the collapse function is received in the code view subsequent to the first portion of the visual content being selected in the design view.

20. The computer program product of claim 18 wherein wherein the visual indicator further indicates that the first portion is selected in the design view.

* * * * *